April 2, 1935.  C. S. VREELAND, JR  1,996,131
SOLDERING MACHINE
Filed Aug. 22, 1930  5 Sheets-Sheet 1

April 2, 1935. C. S. VREELAND, JR 1,996,131
SOLDERING MACHINE
Filed Aug. 22, 1930 5 Sheets-Sheet 5
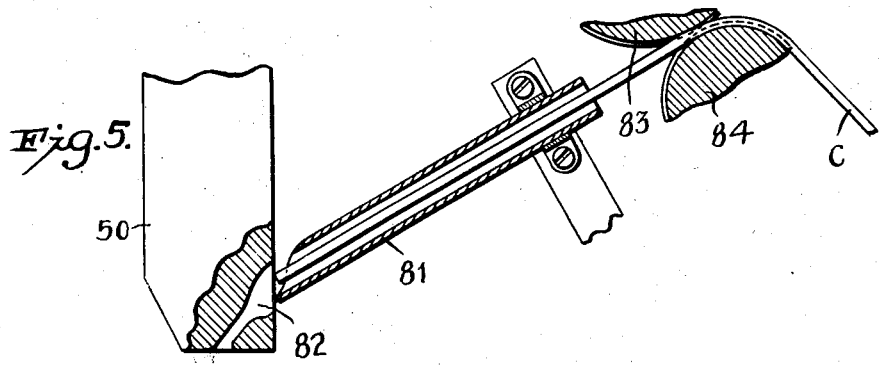
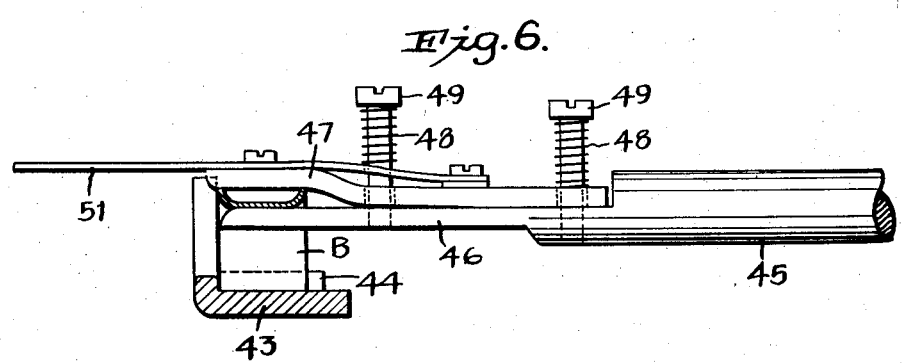
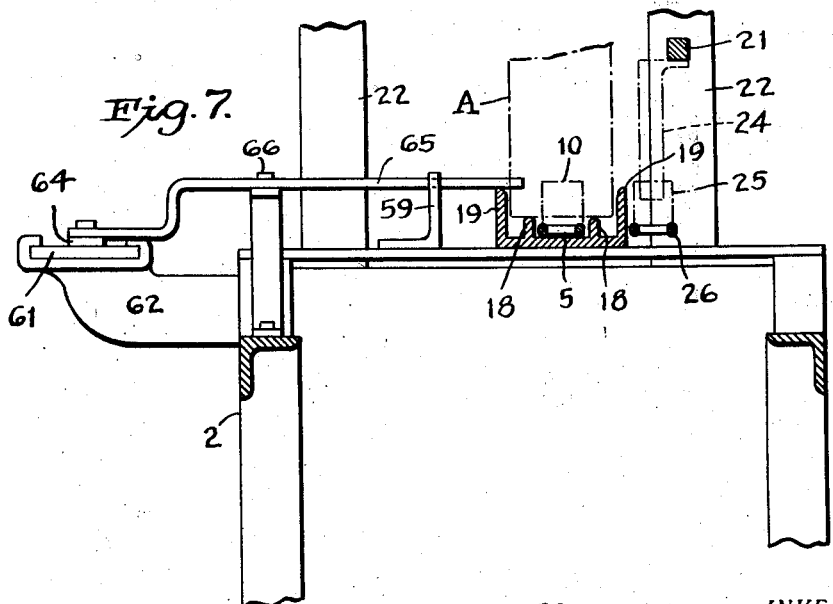

Patented Apr. 2, 1935

1,996,131

UNITED STATES PATENT OFFICE 1,996,131

SOLDERING MACHINE

Charles S. Vreeland, Jr., Bayonne, N. J., assignor of three-fourths to Tide Water Oil Company, Bayonne, N. J., a corporation of New Jersey Application August 22, 1930, Serial No. 477,002

37 Claims. (Cl. 113—59)

The machine of the invention is designed particularly for soldering handles on cans, and the machine will be thus described, but with suitable modification the invention or parts thereof may be applied to other soldering operations.

Objects of the invention are to provide a machine which is simple and compact and automatic and reliable in its action, to provide a machine which is very economical in the consumption of solder, to provide a machine which requires as little gas and air, or other fuel or energy for heating, as possible, to provide a machine which has a large output and which can be attended by one unskilled operative, to provide a machine in which there is no hazard to the attendant, to provide a machine which requires no compressed air for cooling the handles or attachments after they are soldered to the bodies, to provide a machine which solders the attachments to the cans without danger of scorching or burning either the can body or the handle, to provide a machine in which the bodies are brought automatically to the soldering station, to provide a machine in which an attachment is carried to position for soldering only when there is a body to receive it, to provide a machine in which the solder is fed automatically and in which the solder feeds only when a body is present, to provide a machine having a continuously moving conveyer which advances the bodies to the soldering station at intervals, to provide a machine having means for automatically ejecting the bodies after the attachments have been soldered to them, to provide a machine having means for justifying the positions of the body and of the attachment at the soldering station, and to provide a machine which executes a neat and strong soldering job.

The invention comprises novel features and combinations making it possible to realize these objects. The can bodies are brought successively to a soldering station, where each can rests beneath or otherwise adjacent a soldering head. A means is provided for introducing a handle attachment between the can body and the soldering head. Mechanism then produces relative movement between the can body and the soldering head, so that the can body and the handle, properly associated, are subjected to a soldering operation. This is preferably effected by providing a raising and lowering platform, on which the can body is supported at the soldering station. The attachment having been soldered to the body, reverse relative movement between the body and the soldering head is produced, preferably by lowering the platform. The can is then ejected or carried away from the soldering station by suitable means.

The term "soldering head" is used in a general sense. In the most advantageous embodiment of the invention, the soldering head is one having irons to heat and melt the solder without burning the can or the attachment. The relative movement between the can body and the soldering head, such as that obtained by raising the platform, causes the portions of the handle which are to be soldered to be clamped between the can body and the irons, this clamping insuring a good joint. A further important provision is a means to prevent the attachment from adhering to the irons, and thus to keep the freshly soldered joint from being broken or weakened, when the can and the irons are separated after the soldering. This is accomplished by means of a resilient or equivalent yielding device which presses on the soldered attachment, holding it to the can with sufficient force to break any solder bond between the irons and the attachment when the platform is lowered.

The invention also includes provisions for alining or precisioning the relations of the can body and the attachment in preparation for the soldering.

The specific nature of the means for introducing the attachment into position between the can body and the soldering head may be varied. A simple and advantageous mechanism has been devised, consisting of a reciprocatory carrier having jaws, one at least of which is yieldingly pressed toward the other. This carrier advances at the proper time, clasps a handle awaiting it on a ledge or support removed from the soldering station, and retreats so as to bring the handle into position between the can body and the soldering head. Then the can body is raised. By this relative movement, the body and the handle are brought into contact and the handle is brought into contact with the irons, one of the jaws of the attachment carrier yielding to this movement and holding the attachment in place until the attachment is held clamped between the cans and the irons. Then the handle carrier retreats farther, and a spring presses on the handle to separate the handle from the irons after the soldering has been accomplished and when the relative movement in the sense of lowering the can or raising the head is brought about.

The invention also includes a continuously moving conveyer for advancing the bodies to the soldering station, this conveyer having pushers spaced apart a distance greater than the length (lengthwise of the conveyer) of the can bodies, thus doing away with intermittently operated mechanism for the purpose.

Means are provided to prevent an attachment from being carried into position when there is no body to receive the attachment.

A means for feeding strip or wire solder is provided for automatically supplying solder to the soldering irons for securing the attachments to the can bodies, and the solder feeding means is operated by the can body, so that no solder will be fed unless there is a body present.

Other features and combinations of the invention, and the applicability of parts of the invention to somewhat different forms of materials operated upon will be apparent to those skilled in the art.

In the accompanying drawings, showing by way of illustration a preferred embodiment of the invention:

Fig. 5 is a fragmentary detail view, partly in elevation and partly in section, illustrating parts of the soldering mechanism;

Fig. 6 is a fragmentary detail view of the mechanism for grasping and positioning the can handle; and Fig. 7 is a fragmentary sectional view taken on the line 7—7 of Fig. 3.

Figure 1:
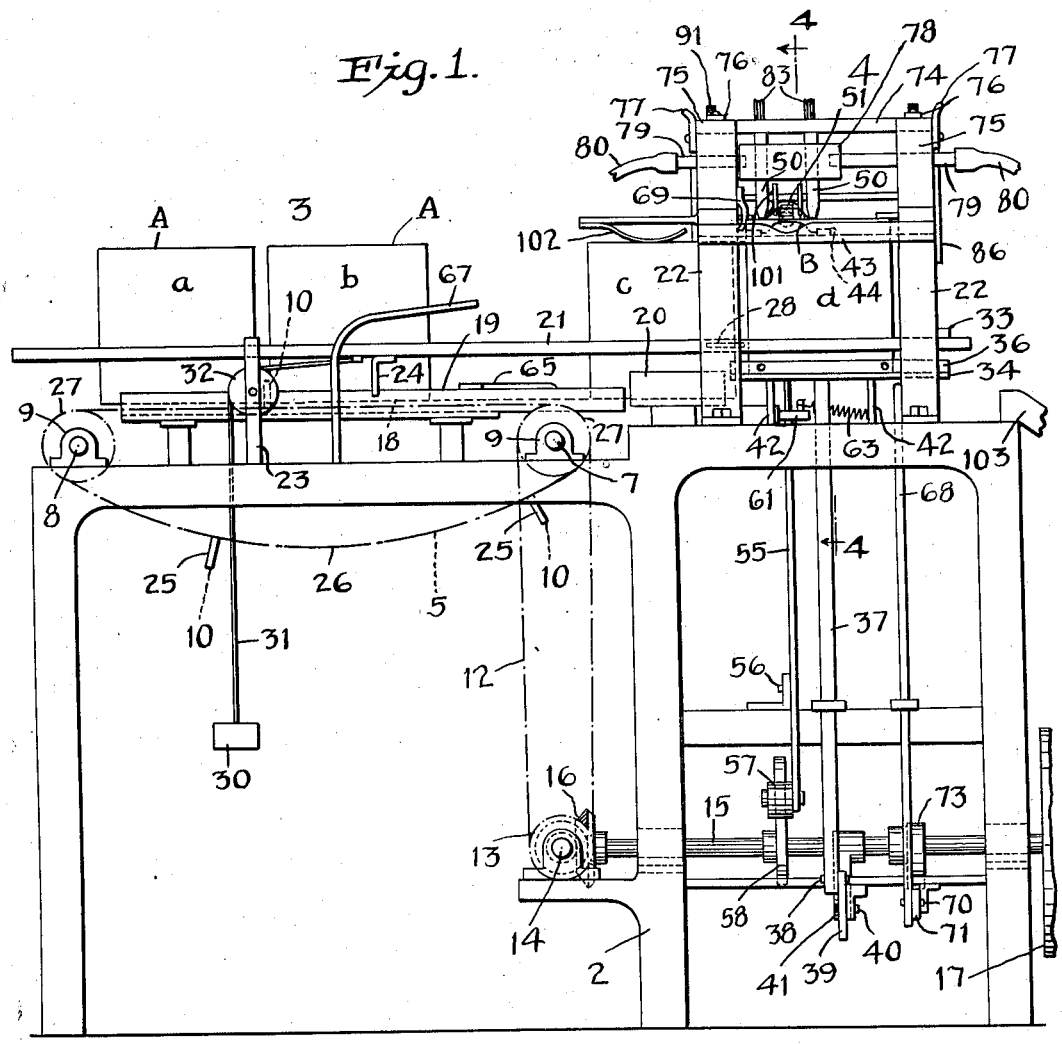
Fig. 1 is a front elevation of the improved handle soldering machine.

In the drawings, the reference numeral 2 designates the frame of the machine. This frame may be constructed in any suitable manner, and as illustrated particularly in Fig. 1, the can feeding means 3 is at one end thereof and the handle positioning and soldering means 4 is situated at the other end.

The can feeding means comprises a chain 5 (see Figs. 1, 3 and 7), engaging sprockets 6, which are mounted on shafts 7 and 8 supported in bearings 9 on the frame 2. Pushers 10, equidistantly spaced, are secured to the links of the chain and act to advance the cans to the soldering and handle positioning means 4.

The shaft 7 is a driven shaft having the driving sprocket 11. A sprocket chain 12 engages sprocket 11 and sprocket 13 which is secured to the countershaft 14. The countershaft 14 is driven from the main driving shaft 15 by bevel gearing 16. The main driving shaft 15 carries suitable cams, hereinafter described, for operating the handle soldering and positioning means and may be driven by a pulley 17 belted to a suitable source of power.

Figure 3:
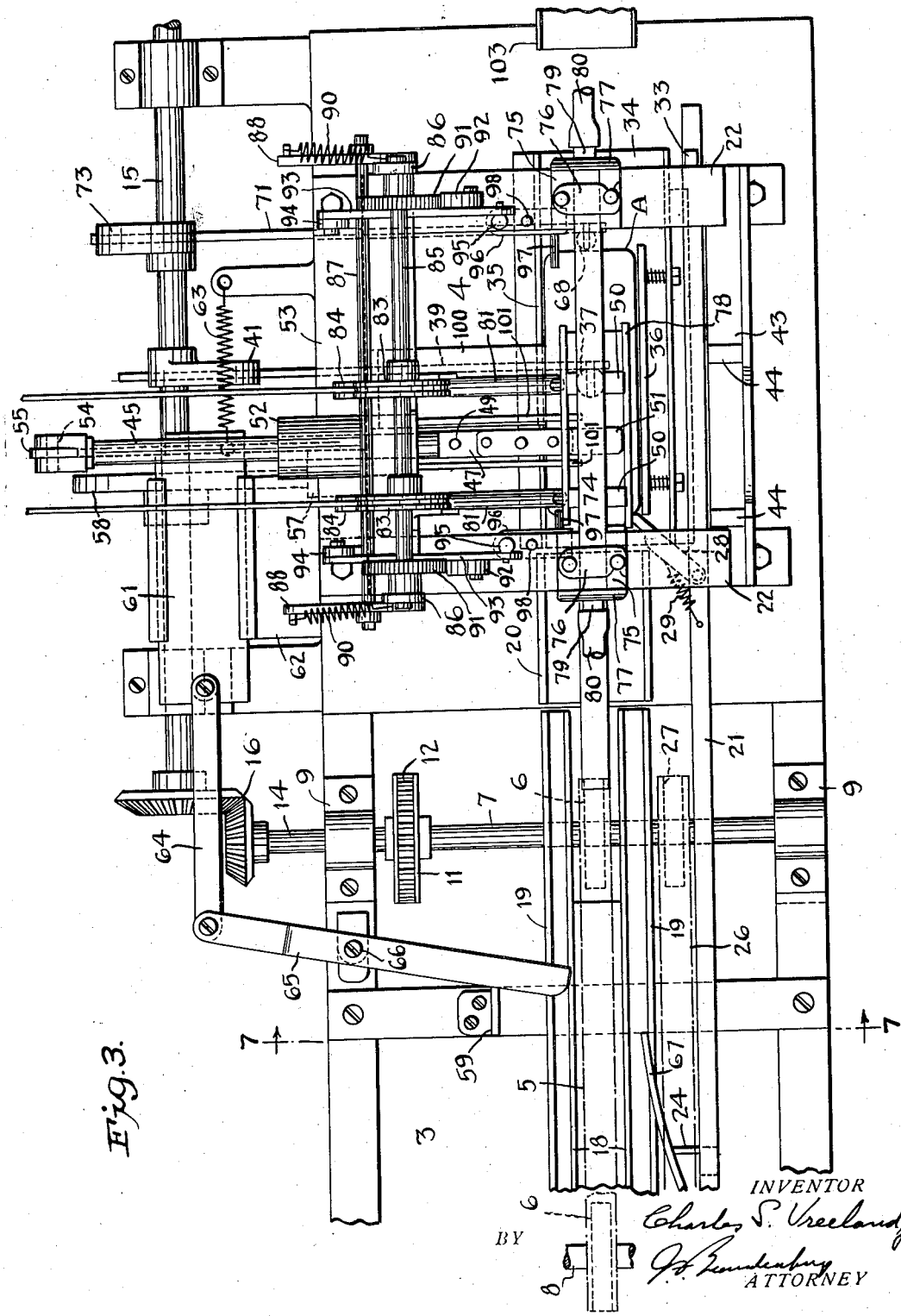
Fig. 3 is a top plan view, the feeding end of the machine being broken away.
Figure 4:
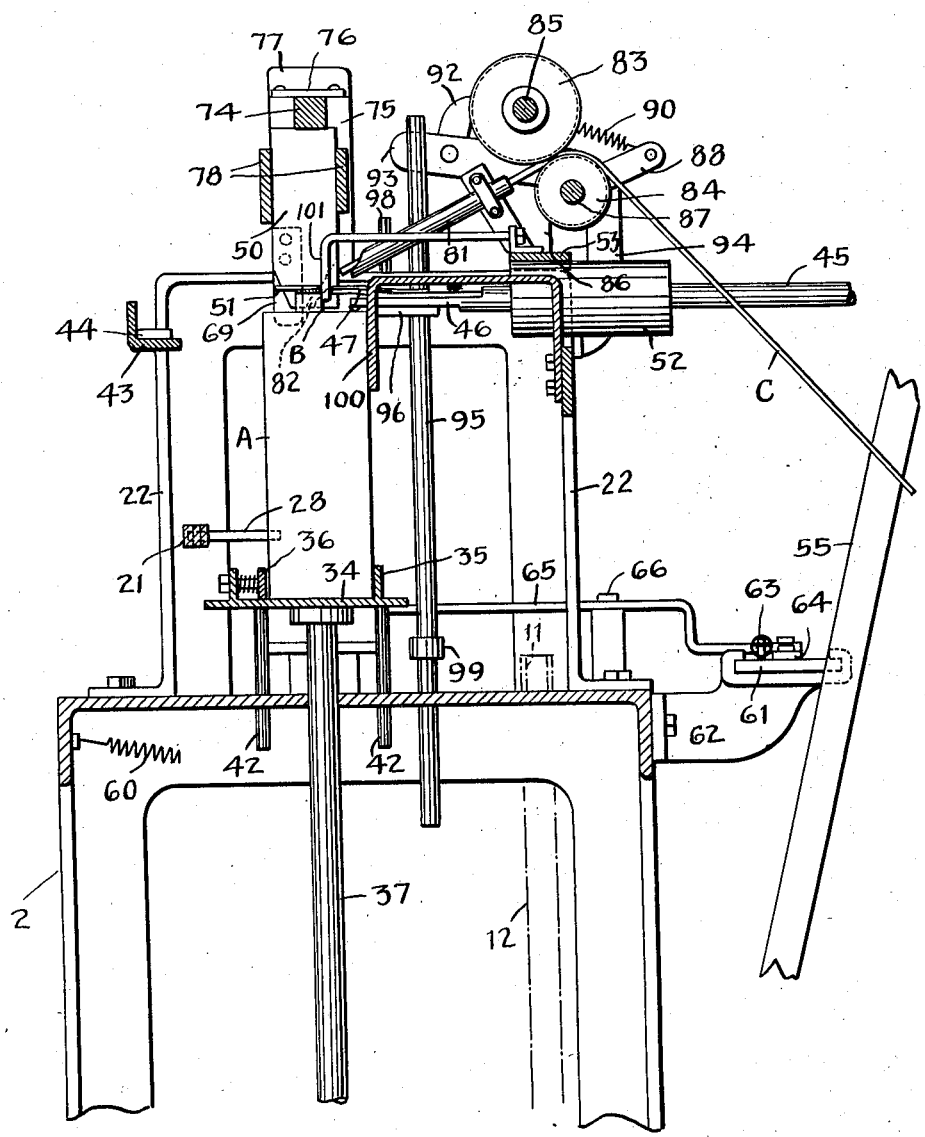
Fig. 4 is a vertical sectional view taken on the line 4—4 of Fig. 1.

The upper run of the chain 5 passes between longitudinally extending can supports 18 and lateral can guides 19, as shown particularly in Figs. 3 and 7. The chain rests below the top of the supports 18, and thus when one of the cans A is placed in the position a of Fig. 1 the chain will pass freely under the can and the can will not be advanced until engaged by one of the pushers 10. The pushers being spaced apart a distance substantially greater than the length of the cans, a period of rest is provided when the can reaches the handle soldering position as will be more apparent hereinafter.

Upon being engaged by one of the pushers 10, the can will be advanced to the position b. However, it is to be understood that the position b in Fig. 1 is not a stationary position. The chain 5 is constantly driven and when one of the pushers 10 engages the can in position a it will advance it continuously until it is left in a guide or stationary platform 20 adjacent the soldering and handle positioning means 4, which is position c in Fig. 1. The platform 20 could be a continuation of the guides 19 and supports 18.

The can remains in position c until it is pushed by a can progressing from position b, and by it advanced to position d, where it is properly placed to have the handle B positioned on and soldered to it. The can previously in the position d and which has had a handle soldered thereto might be ejected from the machine by the can advancing from position c to assume position d, or positive means may be provided for ejecting the cans.

An ejector bar 21 is shown slidably mounted in standards 22 and a support 23. This ejector bar carries a depending finger 24 (Figs. 1, 3 and 7), which is engaged by pushers 25 similar in number to the pushers 10 on chain 5. The pushers 25 are secured to the links of a sprocket chain 26, which engages sprockets 27 secured to the shafts 7 and 8, the sprocket 27 secured to shaft 7 acting as the driving sprocket.

The ejector bar 21 carries a pivoted finger 28, which is urged by a spring 29, as shown in Fig. 3, to swing in behind the cans. After the handle has been soldered on the can the ejector bar is moved toward the right in Fig. 3 by virtue of one of the pushers 25 engaging the depending finger 24 and the can is positively ejected by the finger. The ejector rod is retracted, as by means of a weight 30 secured to one end of a cable 31, shown in Fig. 1. The cable 31 passes over a pulley 32 mounted on the support 23 and its other end is fast to the ejector rod. The pivoted finger 28 latches by the cans when the ejector bar is retracted and a stop 33 is provided to limit the rearward movement of the ejector bar.

When a can A reaches position d, where the handle B is associated with the can and soldered, it is placed on a platform 34, beneath a part or subassembly of the machine at the region marked 4, which may be termed a soldering head. As illustrated in the drawings, this platform has been elevated, the handle has been positioned on the can and soldering operation is about to commence. As the can is moved onto the platform 34, the platform is in its lowered position or on the same level as the stationary platform 20 and the can supports 18. The platform 34 is provided with a fixed flange 35 and a spring-pressed shoe 36 to act as side supports for the can, the spring pressed shoe compensating for variations in the widths of the cans.

The platform 34 is carried on the upper end of a reciprocating bar or rod 37, which has its lower end connected at 38 to a cam lever 39. The cam lever 39 is pivoted to the main frame at 40 and its free end is against the cam 41 secured to the main driving shaft 15, the cam 41 being so shaped and timed as to raise and lower the platform 34 at the proper times. Pins 42 sliding in apertures in the main frame act as guides for the platforms 34.

The handles B are placed by the operator on a ledge 43 on the front part of the machine. A pair of stops 44 are formed on this ledge between which the handle is properly located. Fig. 6 shows the handle placed between these stops and being grasped by the handle carrying and positioning means.

The handle carrying and positioning means comprises a reciprocating shaft 45 having a rigid jaw 46 and a movable jaw 47. The movable jaw 47 is pressed toward the fixed jaw 46 by springs 48 mounted on studs 49 passing through the movable jaw and threaded into the fixed jaw, thus providing means for lightly but firmly grasping the handle B.

The handle positioning means is moved over to pick up the handle before the can has been raised by the platform 34. As soon as the jaws 46, 47, by their rearward movement, have moved the handle to the proper position over the can the platform 34 elevates the can. As the can rises it contacts with the handle and raises the latter, bringing the ends or feet of the handle into contact with the irons 50, hereinafter described. The ends of the handle are then clamped between the top of the can and the soldering irons 50. While the handle is raised as just described, the jaw 47 remains in contact with the handle, since this jaw can be raised against the pressure of the yielding springs 48. The handle positioning means then continues to move back, away from the handle, and a spring finger 51 secured to the upper jaw rests on the handle B. Solder being fed at the proper time by the means later to be described, the handle is soldered to the body while the ends of the handle are clamped between the body and the irons.

The spring 51 is to keep the handle in position after it has been soldered and while the solder hardens. When the soldering has been completed the can is lowered and as the spring exerts downward pressure it will prevent the ends of the handle from adhering to the soldering iron 50, thus insuring that the freshly soldered connection between the handle and the body will not be broken.

The shaft 45 is mounted in a guide 52 on a cross-member 53 carried by the standards 22. The end of the shaft 45 opposite the jaws 46, 47 is connected at 54 to a lever 55, which is pivoted at 56 to a bracket secured to the main frame 2. The other end of lever 55 carries a cam roller 57 which bears against a cam 58 mounted on the main driving shaft 15. The cam 58 is suitably formed to cause the handle positioning means to function as heretofore described. A spring 60 holds the cam roller 57 against the cam 58. The spring 60 will readily give if the operator in placing a handle on the ledge 43 should carelessly allow his fingers to come in contact with the handle positioning means, and thus prevent injury to the operator.

Means are provided to prevent the handle positioning means from functioning unless a can is placed on the platform 34. A slide 61 is mounted in guides formed in a bracket 62 secured to the frame 2. This slide will normally intercept the lever 55 and act as a stop to prevent the lever operating the handle positioning means. A spring 63 urges the slide 61 to this position.

A link 64 is pivoted to the slide and the opposite end of the link 64 is pivoted to a lever 65. The lever 65 is pivoted at 66 to a bracket on the frame 2 and the free end of this lever lies in the path of travel of the cans A. When a can is being advanced from position $b$ to position $c$ it pushes the free end of the lever 65 and the slide 61 is moved out of the path of lever 55, thus allowing the handle positioning means to function. If a can should be missing in the regular succession of cans moved through the machine, the can in position $c$ would not be advanced. Obviously, there would then be no can in position $d$, and it is most desirable that the handle positioning means can not function under such conditions. There being no can to move from position $b$ to position $c$, the free end of lever 65 would not have been displaced and the handle positioning means would not have operated. A stop 59 limits the rearward movement of lever 65.

When the lever 65 is pushed by one of the cans, there is a slight tendency to overbalance the can. To offset this a flexible finger 67 is arranged to press against the other side of the can.

Figure 2:
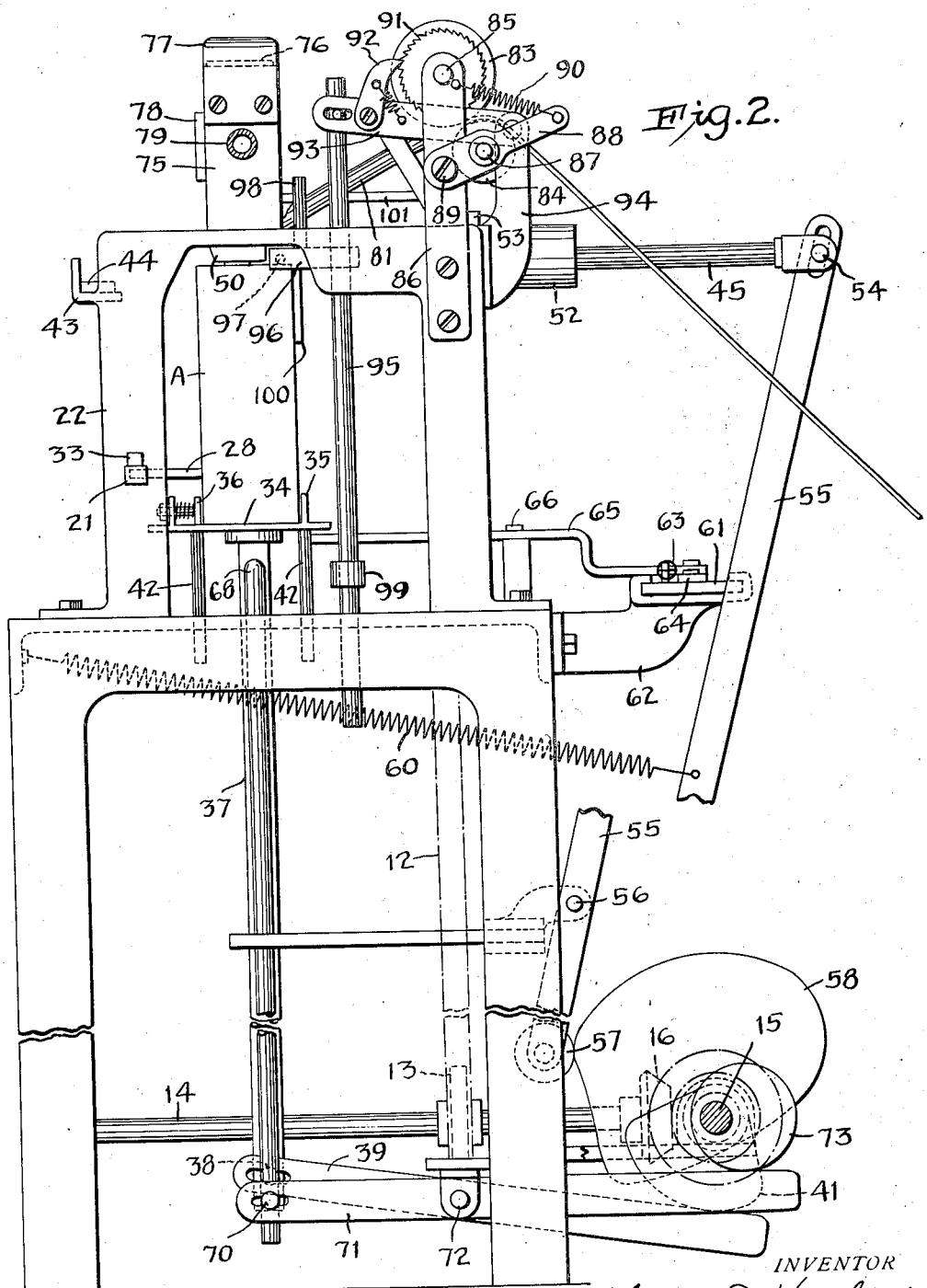
Fig. 2 is an end elevation on a larger scale, intermediate parts of the framework and some of the operating members being broken away for economy of space.

Means are provided for insuring that the can will be properly presented on its upward movement. A movable stop 68 (Figs. 2 and 3) prevents the can moving too far forward. This stop as illustrated in the drawings is almost in its lower position. It remains in the lower position until the can has been ejected from position $d$, and it is then raised to act as a stop for the next can reaching this position. A fixed finger 69 acts as a guide at the upper part of the can.

The stop 68 is in the form of a rod and its lower end is connected at 70 to a cam lever 71. The cam lever 71 is pivoted to the frame at 72 and its free end bears against the cam 73 secured to the main driving shaft 15.

At the soldering head, the soldering irons 50 heretofore mentioned are secured to a horizontal bar 74, which is mounted in sockets formed in uprights 75 secured to the standards 22. The bar is removably confined in the uprights 75 by latches 76, which may be easily and quickly released for removing the soldering irons for cleaning purposes for applying the usual solutions to aid the soldering operation. Guides 77 facilitate the insertion of the bar 74 in its sockets. Plates 78 may be secured to the soldering irons for confining the heat and also to shield the operator. As illustrated, the soldering irons are heated by burners 79 provided with fuel and air through hose connections 80. It is to be understood that the construction of the soldering head and the parts of which it is composed may be varied.

Means are provided for feeding solder to the soldering irons 50. An important feature of the invention is a device which insures that no solder is fed to the soldering irons 50 unless a can is present under the irons.

The solder C in wire form is fed through tubes 81 suitably mounted on the standards 22 on the cross-member 53, to apertures 82 in the soldering iron 50. It is passed between grooved feeding rollers 83 and 84. The rollers 83 are mounted on a shaft 85, which is carried in brackets 86 secured to the standards 22. The rollers 84 are mounted on a shaft 87 carried in arms 88, which are pivoted at 89 to the brackets 86. Springs 90 urge the rollers 84 toward the rollers 83, so as to provide a positive feed for the solder.

The shaft 85 also carries ratchet wheels 91, which are engaged by spring-pressed pawls 92. The pawls 92 are pivoted on arms 93, which in turn are pivoted in brackets 94 carried by the standards 22. The opposite ends of arms 93 have slotted connections with rods 95, which are slidably mounted and guided in the frame 1 and standards 22.

Projections 96 on rods 95 carry pins or feelers 97 which rest on the tops of the cans, and also carry guide pins 98 to prevent rods 95 from turning. Stop collars 99 are provided on the rods 95 to limit their downward movement.

When a can is positioned on the platform 34 and the platform is elevated, the can acting on the pins 97 will raise the rods 95, causing the pawls 92 to advance the ratchets 91 several teeth, which in turn will rotate the feed rollers 83 and 84 a sufficient distance to feed the required amount of solder for one operation. If no can is positioned on the platform, it follows that the solder C will not be fed.

A bracket 100 secured to the standards 22 acts further to insure proper presentation of the can. L-shaped stop rods 101 mounted on the cross-member 53 also function to aid in positioning the handles B. A spring member 102 (Fig. 1) mounted on an extension from one of the standards 22 steadies the cans in position c.

After the handle has been soldered onto the can the can may be ejected on a slide or chute 103 or it may pass directly onto a suitable conveyer for carrying it to a testing machine or other apparatus.

At the feed-in end of the machine, the cans may be placed in the guide 19 by hand, or they may be delivered automatically to this guide.

The operation will be briefly reviewed. The cans, one after another, are placed in the guide 19, and are advanced at regular intervals by the conveyer chain 5 and its pushers 10. Each can in its progress encounters the lever or feeler 65 and releases the handle-carrying means to bring a handle to position for soldering. If a can is missing, a can will not be brought into position to receive a handle, consequently the desirability of preventing the operation of the handle-carrying mechanism under those circumstances. This feature means, no can, no handle.

Each can pushes a preceding can onto the vertically movable platform 34 when the latter is down. This platform rises, raising the can up against the handle, which has been brought to position by the device 45, 46, 47, and presses the ends of the handle, resting on the top of the can, up against the soldering irons 50. Solder is automatically fed to the latter by the rollers 83, 84 and the actuating mechanism connected with the roller 83, but as this mechanism is actuated by the upward movement of the can striking the pins 97, solder will be fed only when a can is present to receive a handle. This feature means, no can, no solder.

The operation of the various parts and mechanisms have been explained in more detail in the body of the description.

I have illustrated a practical and operative embodiment of the invention, but it will be evident to those skilled in the art that numerous changes and substitutions may be made without departing from essentials. Motions which in their effect are relative may be reversed in respect to the part which is moved and the part which is stationary.

I claim:

1. In a machine for soldering attachments to bodies, the combination of a soldering head having irons, means for automatically bringing the bodies to a position adjacent the soldering head, separate means for bringing an individual attachment to a position adjacent the soldering head, and additional means for moving each body relatively to the attachment and to the soldering head to associate the body and the attachment and to make contact with the irons.

2. In a machine for soldering attachments to bodies, the combination of a soldering platform, a soldering head having irons, means for bringing the bodies successively to the soldering platform, means for bringing an individual attachment to position over each body on the platform, and means for moving the platform up and down to bring the body into contact with the attachment and the soldering irons.

3. In a machine for soldering attachments to bodies, the combination of a soldering platform, a soldering head having irons, means for reciprocating one of these elements toward and from the other, and means for introducing an individual attachment in position between the irons and a body on the platform.

4. In a machine for soldering attachments to bodies, the combination of a soldering head, a holder for a body, means for reciprocating one of these elements toward and from the other, means for bringing the bodies to said holder, and means for introducing an individual attachment in position between the soldering head and a body on the holder.

5. In a machine for soldering attachments to bodies, the combination of a soldering head, a holder for a body, means for reciprocating one of these elements toward and from the other, means for bringing the bodies to the holder, means for introducing an attachment in position between the head and a body on the holder, and means for preventing operation of the attachment-introducing means in the absence of a body.

6. In a machine for soldering attachments to bodies, the combination of a soldering head, a holder for a body, means for reciprocating one of these elements toward and from the other, means for bringing the bodies to the holder, a carrier for introducing an attachment in position at the soldering head, and means adapted to be controlled by the bodies as they are brought toward the holder to control in turn the operation of the attachment carrier.

7. In a machine for soldering attachments to bodies, the combination of a soldering head, a solder feed, a soldering platform, means for bringing the bodies to said platform, a carrier for introducing an attachment between the soldering head and a body on the platform, and means causing said solder feed to operate only in the presence of a body.

8. In a machine for soldering attachments to bodies, the combination of a soldering head, a solder feed, a soldering platform, means for bringing the bodies to said platform, a carrier for introducing an attachment between the soldering head and a body on the platform, and means causing said carrier to operate only in the presence of a body.

9. In a machine for soldering attachments to bodies, the combination of a soldering head, a solder feed, a soldering platform, means for bringing the bodies to said platform, a carrier for introducing an attachment between the soldering head and a body on the platform, means causing said solder feed to operate only in the presence of a body, and means causing the said carrier also to operate only in the presence of a body.

10. In a machine for soldering attachments to bodies, the combination of a soldering head, a solder feed, a soldering platform, means for bringing the bodies to said platform, a carrier for introducing an attachment between the soldering head and a body on the platform, means controlled by the bodies to control the solder feed, and means also controlled by the bodies to control said carrier.

11. In a soldering machine, the combination of a soldering head, a soldering platform, means to reciprocate one of these elements toward and from the other, an attachment receiver, a carrier adapted to pick an attachment from said receiver, and means for operating the carrier to remove an attachment from the receiver and carry it to position between the soldering head and a body on the platform.

12. In a soldering machine, the combination of a soldering head, a soldering platform, means to reciprocate one of these elements toward and from the other, an attachment receiver, a carrier adapted to pick an attachment from said receiver, means for operating the carrier to remove an attachment from the receiver and carry it to position between the soldering head and a body on the platform, and means for alining the attachment with respect to the soldering head.

13. In a soldering machine, the combination of a soldering head, a soldering platform, means to reciprocate one of these elements toward and from the other, a carrier to introduce an attachment in position between the soldering head and a body on the platform, and means for alining the body.

14. In a soldering machine, the combination of a soldering head, a soldering platform, means to reciprocate one of these elements toward and from the other, a carrier to introduce an attachment in position between the soldering head and a body on the platform, means for alining the attachment, and means for alining the body.

15. In a soldering machine, the combination of a soldering head, a soldering platform, means reciprocating one of these elements toward and from the other, and a continuously moving conveyer having means for advancing bodies at intervals toward said soldering platform.

16. In a soldering machine, the combination of a soldering head, a soldering platform, means for reciprocating one of these elements toward and from the other, a continuously moving conveyer having means for advancing bodies at intervals toward said soldering platform, and an ejector for displacing the bodies from said platform.

17. In a machine for soldering handles to can bodies, the combination of a stationary soldering head having irons, means for automatically bringing the can bodies into position adjacent the soldering head, separate means for bringing a handle into position adjacent the soldering head, and additional means for moving the can body upward to the soldering head to associate the can body and the handle and to make contact with the irons.

18. In a machine for soldering handles to can bodies, the combination of a soldering platform, a stationary soldering head having irons, means for bringing the can bodies to the soldering platform, means for bringing a handle to position over each can body on the platform, and additional means for moving the platform up and down.

19. In a machine for soldering handles to can bodies, the combination of a soldering platform, a stationary soldering head having irons, means for reciprocating the platform toward and away from the irons, and means for introducing a handle between the irons and a can body on the platform.

20. In a machine for soldering attachments to bodies, the combination of a soldering head, a soldering platform, means for moving the platform toward and away from the soldering head, means for bringing the bodies to said platform, a carrier for introducing a handle between the irons and a body on the platform, and yielding means acting to bear on the soldered attachment and keep it from adhering to the soldering head as the body is moved away from the soldering head.

21. In a machine for soldering attachments to bodies, the combination of a soldering head, means for bringing these bodies beneath the head, means for introducing an attachment between the body and the soldering head, means for raising and lowering the body to and from the soldering head, and means adapted to bear on the soldered attachment and keep it from adhering to the soldering head as the body is moved downward.

22. In a machine for soldering attachments to bodies, the combination of a soldering head, means for bringing the bodies beneath the head, a carrier for introducing an attachment between the body and the soldering head, means for raising and lowering the body to and from the soldering head, and yielding means carried by said carrier, said yielding means acting to bear on the soldered attachment and keep it from adhering to the soldering head as the body is moved downward.

23. In a machine for soldering attachments to bodies, the combination of a soldering head, a support for the body, means for reciprocating one of the elements toward and from the other, mechanism for introducing an attachment in position between the soldering head and the body on the support, and means for preventing the operation of the attachment-introducing mechanism in the absence of a body.

24. In a machine for soldering attachments to bodies, the combination of a soldering head, a support for the body, means for reciprocating one of the elements toward and from the other, machanism for introducing an attachment in position between the soldering head and the body on the support, solder-feeding means, and means for preventing operation of the solder-feeding means in the absence of a body.

25. In a machine for soldering attachments to bodies, the combination of a soldering head, a support for the body, means for reciprocating one of the elements toward and from the other, mechanism for introducing an attachment in position between the soldering head and the body on the support, solder-feeding means, and means controlled by the movement of the body for operating the solder-feeding means only when there is a body on the support.

26. In a machine for soldering attachments to bodies, the combination of a soldering head, a support for the body, means for reciprocating one of the elements toward and from the other, mechanism for introducing an attachment in position between the soldering head and the body on the support, means for preventing the operation of the attachment-introducing mechanism in the absence of a body, solder-feeding means, and means for preventing operation of the solder-feeding means in the absence of a body.

27. In a soldering machine, the combination of a soldering head, a soldering platform, means for reciprocating one of these elements toward and from the other, a continuously moving conveyer, and pushers on said conveyer for advancing bodies toward said soldering platform, said pushers being spaced apart a distance considerably greater than the length of the bodies.

28. In a soldering machine, the combination of means for bringing a body to a soldering platform, a soldering head above the platform, mechanism for raising the platform to carry the body into contact with the soldering head, a solder feeding device for supplying solder to the soldering head, a member above the platform and moved by the body as it rises toward the soldering head, and means operated by the rising movement of said member for controlling the operation of the solder feeding device.

29. In a soldering machine, the combination of means for bringing a body to a soldering position, means controlled by the body for supplying an attachment at the soldering position, and means for soldering the attachment to the body.

30. In a machine for soldering attachments to bodies, the combination of a soldering head, means for bringing these bodies beneath the head, means for introducing an attachment between the body and the soldering head, means for moving the soldering head and body with respect to one another so that one of them is movable toward and from the other, and means movable into contact with the soldered attachment to keep it from adhering to the soldering head as the body and soldering head move apart.

31. A soldering machine including means for soldering an attachment to a body; mechanism for bringing bodies successively into soldering position; an attachment holder; a carrier including a pair of grippers one of which is resilient with respect to the other; and operating mechanism for causing the carrier to move into position to pick up an attachment in the holder and carry the attachment into position between the body and the soldering means.

32. A machine for soldering attachments to bodies including in combination an attachment holder; a carrier including a pair of grippers one of which is resilient with respect to the other; operating mechanism for causing the carrier to move into position to grip an attachment in the holder and then recede to a position in which the attachment is adjacent the body; soldering means for connecting the attachment to the body; and holding means for retaining the freshly soldered attachment in position on the body, said holding means including a resilient extension member connected with the carrier and extending beyond the ends of the grippers.

33. In a soldering machine, the combination of a soldering head, a holder for a body, means for reciprocating the holder and body toward and from the soldering head, solder feeding means, an abutment extending into the path of the body and operated by the reciprocating movement of said body, and motion transmitting connections between the abutment and the solder feeding means for transmitting motion of the abutment directly to the solder feeding means to feed the solder while the abutment is being moved by said body.

34. In a soldering machine, the combination of a soldering head, means for presenting a body to the soldering head, solder feeding means, an abutment extending into the path of the body and moved by said body as its approaches the soldering head, and motion transmitting connections, between the abutment and the solder feeding means, of such a nature that the motion of said body is transmitted directly to the solder to feed the solder as said body moves the abutment.

35. In a soldering machine, the combination of a soldering head, and solder feeding means; means for moving a body to be soldered toward the soldering head, and connections to the solder feed means operated by the body as it moves toward the soldering head for transmitting motion of the body as it moves toward the soldering head directly to the solder feeding means to operate said solder feeding means to feed the solder while the body moves toward the soldering head.

36. In a machine for soldering attachments to bodies, the combination of a fixed soldering head, a holder for a body, mechanism for moving the holder to present the body and an attachment to the soldering head, solder feed mechanism including rollers between which the solder passes, a ratchet connected with one of the feed rollers, a pawl for turning the ratchet, pawl operating means including an abutment extending into the path of the body and operatively connected to the pawl to transmit motion of the body, as it moves toward the soldering head, to the pawl to turn the ratchet and feed rollers to feed the solder while the body is moving toward the soldering head, and means for guiding the solder into contact with the fixed soldering head as the rollers feed the solder.

37. In a machine for soldering attachments to bodies, the combination of a soldering iron, a soldering platform, means for moving the platform toward and from the soldering iron to clamp an attachment between the soldering iron and a body on the platform so that the attachment is soldered to the body, and means for pressing the soldered attachment to the body when the body moves away from the soldering iron, in order to keep the attachment from adhering to the soldering iron.

CHARLES S. VREELAND, Jr.